US011017767B2

(12) United States Patent
Schulz et al.

(10) Patent No.: US 11,017,767 B2
(45) Date of Patent: May 25, 2021

(54) HIERARCHICAL ATTENTION FOR SPOKEN DIALOGUE STATE TRACKING

(71) Applicant: Microsoft Technology Licensing, LLC, Redmond, WA (US)

(72) Inventors: Hannes Schulz, Karlsruhe (DE); Jing He, Mississauga (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 86 days.

(21) Appl. No.: 15/473,409

(22) Filed: Mar. 29, 2017

(65) Prior Publication Data

US 2017/0287478 A1    Oct. 5, 2017

Related U.S. Application Data

(60) Provisional application No. 62/314,570, filed on Mar. 29, 2016.

(51) Int. Cl.

| G10L 15/22 | (2006.01) |
|---|---|
| G10L 15/26 | (2006.01) |
| G10L 13/08 | (2013.01) |
| G10L 15/16 | (2006.01) |
| G10L 15/197 | (2013.01) |
| G10L 25/30 | (2013.01) |

(52) U.S. Cl.
CPC .............. *G10L 15/22* (2013.01); *G10L 13/08* (2013.01); *G10L 15/16* (2013.01); *G10L 15/197* (2013.01); *G10L 15/26* (2013.01); *G10L 25/30* (2013.01); *G10L 2015/223* (2013.01)

(58) Field of Classification Search
CPC .............. G10L 15/22; G10L 2015/226; G10L 2015/228
USPC ................................................ 704/270, 275
See application file for complete search history.

(56) References Cited

U.S. PATENT DOCUMENTS

| 7,251,595 B2 * | 7/2007 | Yasuda | G06F 17/279 704/270 |
|---|---|---|---|
| 7,546,382 B2 * | 6/2009 | Healey | G06F 8/00 704/1 |
| 8,645,122 B1 * | 2/2014 | Di Fabbrizio | G10L 21/00 704/231 |
| 8,775,341 B1 | 7/2014 | Commons | |

(Continued)

OTHER PUBLICATIONS

Henderson, Matthew, et al. "Word-based dialog state tracking with recurrent neural networks." Proceedings of the 15th Annual Meeting of the Special Interest Group on Discourse and Dialogue (SIGDIAL). Jun. 2014, pp. 292-299. (Year: 2014).*

(Continued)

*Primary Examiner* — Shaun Roberts

(57) ABSTRACT

Described herein are systems and methods for providing hierarchical state tracking in a spoken dialogue system. A sequence of turns is received by a spoken dialogue system. Each turn includes a user utterance and a machine act. At each turn, a value pointer and a turn pointer are provided for that turn. The value pointer represents a probability distribution over the one or more words in the user utterance that indicates whether each word in the user utterance is a slot value for a slot. The turn pointer identifies which turn in a set of turns includes a currently-relevant slot value for the slot, where the set of turns includes a current turn for which the turn point is being provided, and all turns that precede the current turn.

20 Claims, 8 Drawing Sheets

| TURN | UTTERANCE | VALUE POINTER | TURN POINTER | DIALOGUE STATE |
|---|---|---|---|---|
| $m_1$ | How may I help you? | | | |
| $u_1$ | Find a restaurant in downtown. | area:downtown | area:$u_1$ | area:downtown |
| $m_2$ | What food do you want to eat? | | | |
| $u_2$ | Is there a good Nepalese place? | food:nepalese | area:$u_1$  food:$u_2$ | area:downtown food:nepalese |
| $m_3$ | I could not find any. | | | |
| $u_3$ | How about Italian? | food:italian | area:$u_1$  food:$u_3$ | area:downtown food:italian |
| $m_4$ | Did you say Italian? | | | |
| $u_4$ | Yes. | | area:$u_1$  food:$m_4$ | area:downtown food:italian |
| $m_5$ | Does Pizzaria Alberto sound good? | | | |
| $u_5$ | Can you give me the phone number? | request:phone | area:$u_1$  food:$m_4$ | area:downtown food:italian request:phone |

(56) References Cited

U.S. PATENT DOCUMENTS

| | | | |
|---|---|---|---|
| 9,015,093 B1 | 4/2015 | Commons | |
| 9,953,637 B1* | 4/2018 | Di Fabbrizio | G10L 15/1815 |
| 10,236,017 B1* | 3/2019 | Witt-Ehsani | G10L 15/26 |
| 2002/0169594 A1* | 11/2002 | Yasuda | G06F 17/279 704/5 |
| 2007/0043561 A1* | 2/2007 | Helbing | G10L 15/08 704/231 |
| 2012/0053945 A1* | 3/2012 | Gupta | G10L 15/22 704/256 |
| 2014/0136212 A1* | 5/2014 | Kwon | G10L 15/22 704/275 |
| 2015/0095033 A1* | 4/2015 | Boies | G06F 16/3329 704/257 |
| 2015/0340033 A1* | 11/2015 | Di Fabbrizio | G10L 15/18 704/254 |
| 2015/0363393 A1* | 12/2015 | Williams | G06F 17/289 704/8 |
| 2016/0188565 A1* | 6/2016 | Robichaud | G06F 16/3325 704/9 |
| 2016/0259775 A1* | 9/2016 | Gelfenbeyn | G06F 17/279 |
| 2016/0293162 A1* | 10/2016 | Takahashi | G06F 17/2785 |
| 2016/0322050 A1* | 11/2016 | Wang | G10L 15/22 |
| 2016/0351206 A1* | 12/2016 | Gelfenbeyn | G10L 25/48 |
| 2017/0091171 A1* | 3/2017 | Perez | G10L 15/22 |
| 2017/0228366 A1* | 8/2017 | Bui | G06F 17/279 |
| 2017/0287478 A1* | 10/2017 | Schulz | G10L 13/08 |

OTHER PUBLICATIONS

Mesnil, Grégoire, et al. "Using recurrent neural networks for slot filling in spoken language understanding." IEEE/ACM Transactions on Audio, Speech and Language Processing (TASLP) 23.3, Mar. 2015, pp. 1-14. (Year: 2015).*

Mesnil, Grégoire, et al. "Investigation of recurrent-neural-network architectures and learning methods for spoken language understanding." Interspeech. Aug. 2013, pp. 1-5. (Year: 2013).*

Henderson, Matthew, et al. "Dialog state tracking challenge 2 & 3." Sep. 2013, pp. 23-30. (Year: 2013).*

Kim, Dongho, et al. "The use of discriminative belief tracking in pomdp-based dialogue systems." 2014 IEEE Spoken Language Technology Workshop (SLT). IEEE, Dec. 2014, pp. 354-359. (Year: 2014).*

Williams, Jason D. "Web-style ranking and SLU combination for dialog state tracking." Proceedings of the 15th Annual Meeting of the Special Interest Group on Discourse and Dialogue (SIGDIAL). Jun. 2014, pp. 282-291. (Year: 2014).*

Yu, Kai, et al. "Evolvable dialogue state tracking for statistical dialogue management." Frontiers of Computer Science 10.2, Apr. 2016, pp. 201-215. (Year: 2016).*

Ma, Yi, and Eric Fosler-Lussier. "Detecting 'request alternatives' user dialog acts from dialog context." Situated Dialog in Speech-Based Human-Computer Interaction. Springer, Cham, Apr. 2016, pp. 97-102. (Year: 2016).*

Thomson, Blaise, and Steve Young. "Bayesian update of dialogue state: A POMDP framework for spoken dialogue systems." Computer Speech & Language 24.4, Oct. 2010, pp. 562-588. (Year: 2010).*

Žilka, Lukáš, et al. "Comparison of bayesian discriminative and generative models for dialogue state tracking." Proceedings of the SIGDIAL 2013 Conference. Aug. 2013, pp. 452-456. (Year: 2013).*

PCT International Search Report and Written Opinion in International Application PCT/IB2017/000411, dated Jul. 13, 2017, 10 pages.

Henderson, "Machine Learning for Dialog State Tracking: A Review", Proceedings of the First International Workshop on Machine Learning in Spoken Language Processing, 2015, Retrieved from the Internet: https://research.google.com/pubs/pub44018.html, 8 pages.

Henderson et al., "Discriminative Spoken Language Understanding Usingword Confusion Networks", IEEE Spoken Language Technology Workshop (STL), Dec. 5, 2012(May 12, 2012), 6 pages.

Zue et al., "JUPITER: A Telephone-Based Conversational Interface for Weather Information", IEEE Transactions on Speech and Audio Processing, vol. 8, No. 1, Jan. 2000 (Jan. 2000), 12 pages.

Pulman et al., "Conversational Games, Belief Revision and Bayesian Networks", Proceedings of 7th Computational Linguistic in the Netherlands meeting, Nov. 1996 (Nov. 1996), 19 pages.

* cited by examiner

| TURN | UTTERANCE | VALUE POINTER | TURN POINTER | DIALOGUE STATE |
|---|---|---|---|---|
| $m_1$ | How may I help you? | | | |
| $u_1$ | Find a restaurant in downtown. | area:downtown | area:$u_1$ | area:downtown |
| $m_2$ | What food do you want to eat? | | | |
| $u_2$ | Is there a good Nepalese place? | food:nepalese | area:$u_1$   food:$u_2$ | area:downtown food:nepalese |
| $m_3$ | I could not find any. | | | |
| $u_3$ | How about Italian? | food:italian | area:$u_1$   food:$u_3$ | area:downtown food:italian |
| $m_4$ | Did you say Italian? | | | |
| $u_4$ | Yes. | | area:$u_1$   food:$m_4$ | area:downtown food:italian |
| $m_5$ | Does Pizzaria Alberto sound good? | | | |
| $u_5$ | Can you give me the phone number? | request:phone | area:$u_1$   food:$m_4$ | area:downtown food:italian request:phone |

*FIG. 4*

HIERARCHICAL ATTENTION FOR SPOKEN DIALOGUE STATE TRACKING

CROSS-REFERENCE TO RELATED APPLICATION(S)

This application claims priority to U.S. Provisional Application No. 62/314,570. entitled "Hierarchical Attention For Spoken Dialogue State Tracking," filed on Mar. 29, 2016, of which the entire disclosure is hereby incorporated by reference in its entirety.

BACKGROUND

Various spoken dialogue systems have been developed and designed to provide a machine with the ability to converse with a user. A dialogue between the machine and the user relies on turn-taking behavior. For example, a user can ask the machine to locate an Italian restaurant in downtown. In response to the request, the machine may state it was unable find any Italian restaurants in downtown. The user's request and the machine act or response form one turn in the dialogue. As the dialogue progresses, the spoken dialogue system is able to obtain the information needed to complete a user goal.

The user goal is usually defined by a set of requests and a set of constraints. The requests are the information the user wants, and the constraints are the values that constrain the request. In the example above, where the user wants to locate an Italian restaurant in downtown, the request may be an address for the Italian restaurant and the constraints are the food type (Italian) and the location (downtown). The food type and the location are known as slots that are constrained by the values for the slots (Italian and downtown, respectively).

Many approaches for tracking the state the of dialogue have been created, including the dynamic Bayesian network and the learning to rank model. These methods treat state tracking as a classification problem, where separate sub-modules exist for every slot and slot values. However, the classifier approach does not scale well to new slots with large slot value sets.

SUMMARY

Embodiments disclosed herein address the above and/or other problems by providing hierarchical state tracking in a spoken dialogue system. More specifically, a computer-implemented method for providing hierarchical state tracking includes receiving a sequence of turns, where each turn includes a user utterance that includes one or more words and a machine act that includes one or more words. For each turn, a value pointer and a turn pointer are provided. The value pointer includes a probability distribution over the one or more words in the user utterance that indicates whether each word in is a slot value for a slot. The turn pointer identifies which turn in a set of turns includes a currently-relevant slot value for the slot. The set of turns includes a current turn for which the turn point is being provided, and all turns that precede the current turn.

Also disclosed herein is a system that includes at least one processing unit and at least one memory storing computer executable instructions which, when executed by the at least one processing unit, performs the method for providing hierarchical state tracking in a spoken dialogue system.

In another aspect, a computer-implemented method includes receiving a user utterance comprising one or more words and processing, by a recurrent neural network, the user utterance. A determination is made as to whether the user utterance includes a high level of noise. If the user utterance does not include a high level of noise, a value pointer is produced by determining a probability distribution over the one or more words in the user utterance that indicates whether each word in the user utterance is a slot value for a slot. If the user utterance includes a high level of noise, the one or more words in the user utterance are compared with a knowledge database in an embedding space to derive the value pointer.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures. The elements of the drawings are not necessarily to scale relative to each other. Identical reference numerals have been used, where possible, to designate identical features that are common to the figures.

FIG. 4 depicts a sample dialogue between a user and a machine;

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Figure 1:
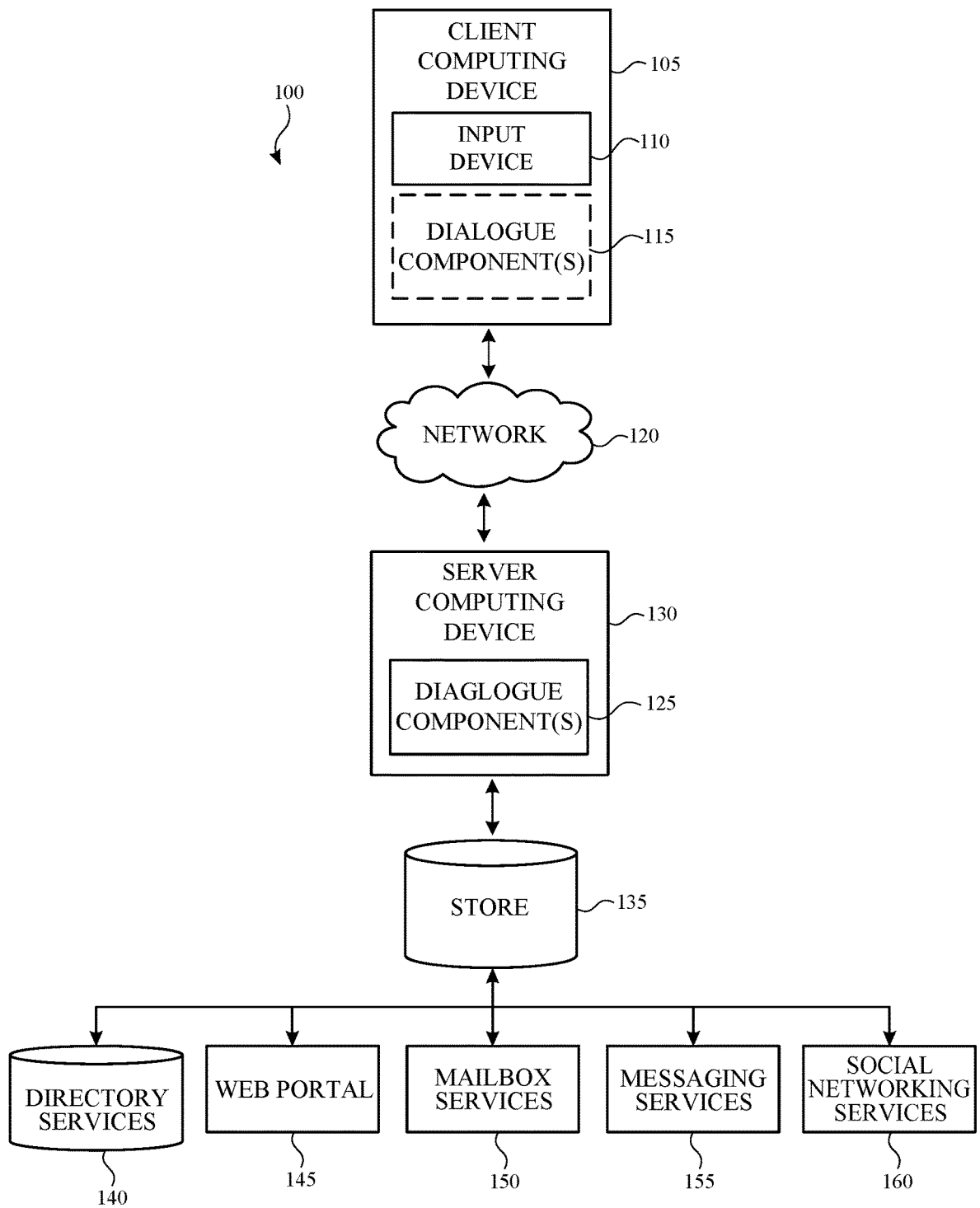
FIG. 1 illustrates a block diagram of a distributed computing system in which aspects of the present disclosure may be practiced.

FIG. 1 illustrates an example system for providing a spoken dialogue system. The system 100 generates and controls a response to a spoken language input. In this context, a spoken language input refers to verbal input and to a text input (e.g., through a messaging application). The system 100 allows a user to submit a spoken language input through a client computing device 105. The client computing device 105 includes an input device 110 and optionally one or more dialogue components 115. The input device 110 may be any suitable type of input device that is configured to receive a spoken language input. In a non-limiting example, the input device 110 is a microphone. Additionally or alternatively, in another non-limiting example, the input device 110 can be a physical keyboard or a virtual keyboard displayed or represented on a touch-sensitive surface.

The client computing device 105 is configured to access one or more networks (represented by network 120) to interact with the dialogue components 125 stored on one or more server computing devices (represented by server computing device 130). In some aspects, the server computing device 130 and/or the dialogue components 125 can access and/or receive various types of information or content that is stored in one or more stores (represented by store 135) or transmitted from other sources, such as a directory service 140, a web portal 145, mailbox services 150, instant messaging services 155, and/or social networking services 160. In some instances, these sources may provide robust reporting, analytics, data compilation and/or storage service, etc., whereas other services may provide search engines or other access to data and information, images, videos, document processing and the like.

In one or more embodiments, the client computing device 105 is a personal or handheld computing device having both input elements and output elements. For example, the client computing device 105 may be one of: a mobile telephone; a smart phone; a tablet; a phablet; a smart watch; a wearable computer; a personal computer; a desktop computer; a laptop computer; a gaming device/computer (e.g., Xbox); a television; and the like. This list of example client computing devices is for example purposes only and should not be considered as limiting. Any suitable client computing device that provides and/or interacts with a spoken dialogue system may be utilized.

As should be appreciated, FIG. 1 is described for purposes of illustrating the present methods and systems and is not intended to limit the disclosure to a particular sequence of steps or a particular combination of hardware or software components.

In task-oriented spoken dialogues, a user has a goal (or task) he or she wants to achieve in the dialogue. A spoken dialogue system obtains information about the user's goal based on the turns in the dialogue. A turn includes a user utterance and a machine act. For example, a user may request a search be performed and the machine act provides a search result or asks a question about the search.

As described earlier, the user goal is usually defined by a set of requests and a set of constraints. The requests are the information the user wants, and the constraints are the values that constrain the request. For example, a user may want the address of a restaurant, and the constraints on the restaurant can be the location of the restaurant, the price, the food type, and the operating hours.

A spoken dialogue system typically operates in a domain. The domain is related to the user's goal. For example, in the weather domain, a user may obtain information on the weather (e.g., temperature). Similarly, in the restaurant domain, a user can obtain the address of a restaurant that serves a particular type of food.

Each domain has slot types ("slots") that are associated with the domain. A slot is a variable, and a slot value is a value that fills the slot. For example, in the restaurant domain, a food type may be a slot and a type of food (e.g., "Italian") can be a slot value for that slot. Over the turns in the dialogue, the spoken dialogue system obtains information about the user goal. In some situations, at least one of the requests or the constraints changes over the course of the dialogue. The embodiments described herein disclose a state tracker that tracks the requests and the constraints throughout the dialogue.

Figure 2:
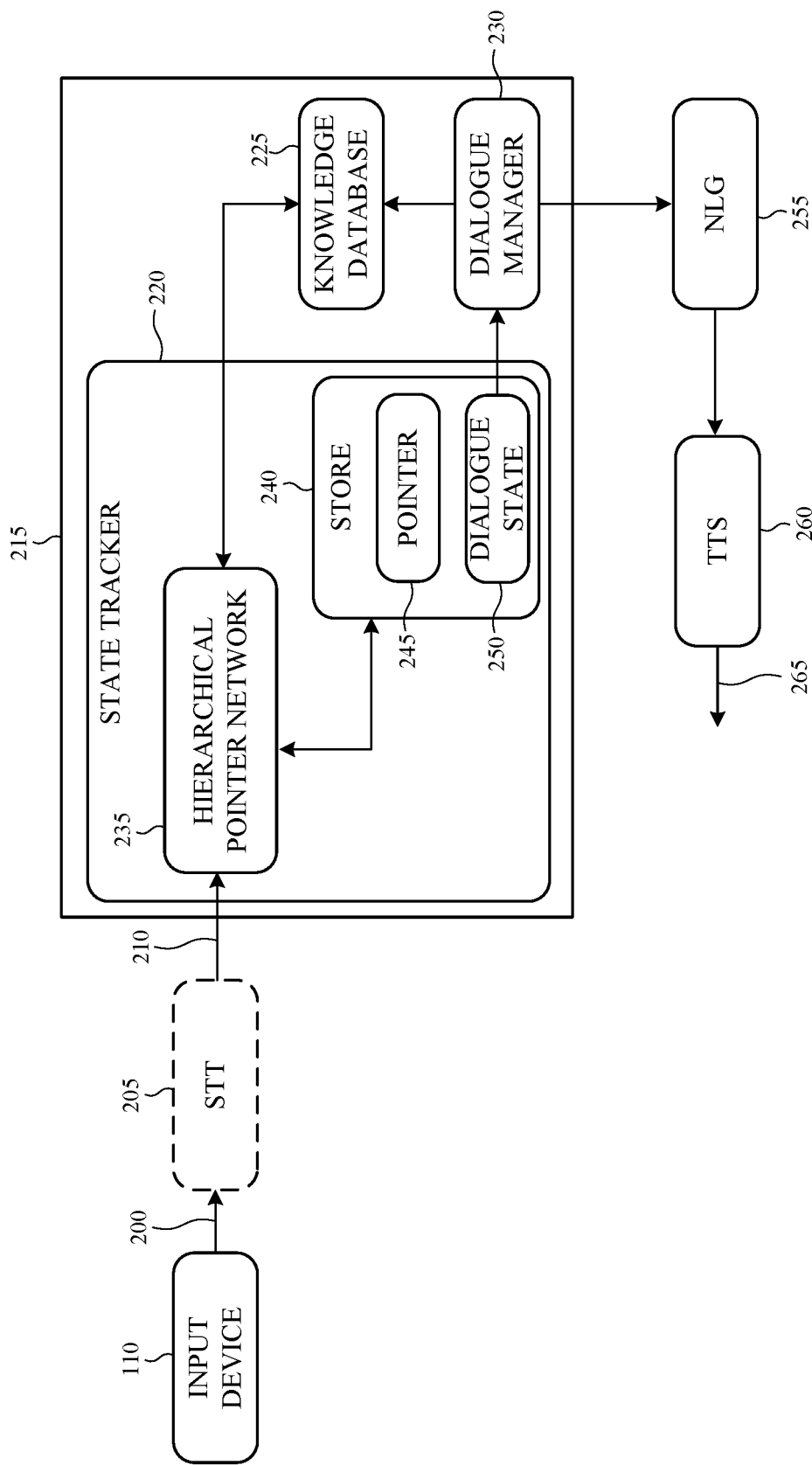
FIG. 2 depicts a process flow for processing a user utterance.

FIG. 2 depicts a process flow for processing a user utterance. An input device 110 receives a spoken language input (an "utterance") from a user. The input device 110 produces an output 200 that represents the user utterance. When the user utterance is a verbal utterance, the output 200 is received by a speech-to-text (STT) application or component 202. One example of a SST component 202 is an automatic speech recognition program.

A spoken dialogue system 215 receives the output 200 or the representation 210 of the user utterance. The spoken dialogue system 215 includes a state tracker 220, a knowledge database 225, and a dialogue manager 230. The operations of the spoken dialogue system 215 are performed by one or more computing devices, such as, for example, one or more server computing devices. The one or more computing devices each include at least one memory that stores computer or processing unit executable instructions that, when executed by at least one processing unit in the computing device(s), perform the operations of the spoken dialogue system 215.

The state tracker 220 provides hierarchical state tracking by providing, for each turn, a likelihood of a slot value for one or more slots being cited in the turn (e.g., in a user utterance), and by identifying which turn in a set of turns includes a currently-relevant slot value for each slot, where the set of turns includes: (1) a current turn for which a turn pointer is being determined; and (2) all turns that precede the current turn. Those skilled in the art will recognize that the determination of which word is a "currently-relevant word" depends on the user behavior and annotation scheme used in the corpus the state tracker learned from.

Based on the value and the turn pointers, a dialogue state can be derived for each turn. As will be described in more detail later, each dialogue state that is received by the dialog manager comprises a probability distribution over all of the slot values for every slot.

The state tracker 220 includes a hierarchical pointer network 235 and one or more stores (represented by store 240). The user utterance is processed by the hierarchical pointer network 235. In one embodiment, the hierarchical pointer network 235 is configured as a recurrent neural network and each step is a word in the user utterance. The output of the hierarchical pointer network 235 includes a value that represents all of the words in the user utterance. For example, the output of the hierarchical pointer network 235 may be configured as a vector.

The output of the hierarchical pointer network 235 also includes one or more value pointers and one or more turn pointers for each turn. As described earlier, a value pointer is a probability distribution over the one or more words in the user utterance that indicates whether each word in the user utterance is a slot value for a slot (or is an affirmation of a slot value for a slot). The value pointer can have a value that ranges from zero to one. The value pointer can have a value of zero when none of the words may be a slot value. For example, a pointer value may be zero when the user does not mention a slot value in the user utterance.

A turn pointer identifies which turn in a set of turns includes a currently-relevant slot value for each slot, where the set of turns includes: (1) a current turn for which a turn pointer is being determined; and (2) all turns that precede the current turn. Each slot has a value pointer and a turn pointer.

The store 240 stores in pointer store 245 the value pointers and the turn pointers produced for each turn. The store 240 also stores in the dialogue state store 250 all of the dialogue states that are produced for each turn. As described earlier, the dialogue manager 230 receives each dialogue state from the store 240. Based on a dialogue state, the dialogue manager 230 determines a machine action (e.g., how the machine should respond to the user utterance). Since a dialogue state is a probability distribution over all of the slot values for every slot, the dialogue state includes the uncertainties associated with the turn (e.g., uncertainties relating to each word being a slot value), which allows the dialogue manager 230 to determine the proper action the machine should take next. For example, the dialogue manager 230 may determine the machine should confirm a slot value that the user mentioned in the user utterance. Alternatively, the dialogue manager 230 can determine the machine should ask for additional information from the user.

In some embodiments, the hierarchical pointer network 235 and the dialogue manager 230 can each access the knowledge database 225. The knowledge database 225 captures or defines information about words, word embeddings, constraints, requests, properties of entities that a dialogue system can talk about, and relationships between words, word embeddings, constraints, requests, and/or the properties of entities (e.g., files, look-up tables, databases, and the like). Non-limiting examples of a knowledge database include an ontology and/or a dictionary. The knowledge database 225 can be stored in one or more stores (e.g., store 135 in FIG. 1).

A natural language generator (NLG) 255 receives the determined response and generates the natural language for the response. A text-to-speech (TTL) component 260 receives the representation of the natural language from the NLG 255 and synthesizes a corresponding verbal output 265.

The various components shown in FIG. 2 can be stored in any suitable device in a system (e.g., client computing device 105, server computing device 130, and store 135 in FIG. 1). For example, in one embodiment, the STT 205, the spoken dialogue system 215, the NLG 255, and the TTS 260 are stored in one or more server computing devices (e.g., server computing device 130). In another embodiment, the STT 205, the spoken dialogue system 215, the NLG 255, and the TTS 260 are distributed over one or more server computing devices and one or more stores (e.g., store 135 in FIG. 1). In another embodiment, the STT 205 and the TTS 260 are stored in a client computing device (e.g., client computing device 105 in FIG. 1) and the remaining components are stored in one or more server computing devices.

Figure 3:
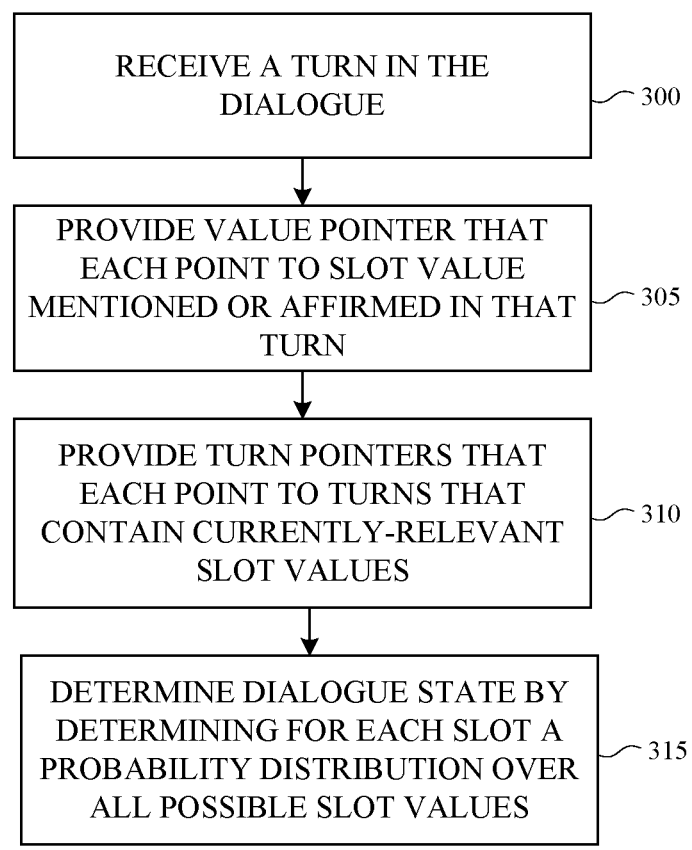
FIG. 3 is a flowchart illustrating an example method for state tracking in a spoken dialogue system.

As described earlier, a dialogue typically contains a number of turns. Each turn includes a user utterance that includes one or more words, and a machine act that includes one or more words. FIG. 3 is a flowchart illustrating an example method for state tracking in a spoken dialogue system. The method of FIG. 3 is performed for each turn in the dialogue.

Initially, at block 300, a turn is received. As described earlier, each turn includes a user utterance and a machine act. At block 305, one or more value pointers are provided for the turn. As previously disclosed, each value pointer is a probability distribution over the one or more words in the user utterance that indicates whether each word in the user utterance is a slot value for a slot (or is an affirmation of a slot value for a slot).

Next, one or more turn pointers are provided for each turn (block 310). Each turn pointer identifies which turn in a set of turns includes a currently-relevant slot value for each slot, where the set of turns includes: (1) a current turn for which a turn pointer is being determined; and (2) all turns that precede the current turn.

A dialogue state is then determined at each turn for each slot (block 315). The dialogue state comprises a probability distribution over all of the slot values for every slot.

In one embodiment, the probability p of a slot s having a value v at a turn t given user utterances $u_{1:t}$ and machine acts $m_{1:t}$ can be determined by the following equation:

$$p(s=v|u_{1:t},m_{1:t})=\Sigma_{k=1}^{t} a_{stk} p(s=v|u_k,m_k) \qquad \text{Equation 1}$$

Equation 1 produces a dialogue state. Equation 1 includes the value pointer and the turn pointer. Inside $p(s=v|u_k, m_k)$ is a value pointer. The vector $a_{stk}=(a_{st1}, \ldots, a_{stt})$ is the turn pointer. The vector $a_{stk}=(a_{st1}, \ldots, a_{stt})$ places attention on ("points to") turn $1 \le k \le t$ if the currently valid value for slot s was set at turn k. Notably, to compute $a_{stk}$, embodiments do not consider the knowledge database (e.g., the ontology) $a_s$ or the value v. The computation depends on the dialogue history and whether any value for s has been mentioned or confirmed by the user in any turn $k \le t$.

The turn pointer $p(s=v|u_k, m_k)$ indicates whether the slot value v for slot s was introduced at turn k. The computation includes the two sources for the introduction of the slot value v, the machine and the user:

$$p(s=v|u_k,m_k)=c_{sk}[v \in m_k]+(1-c_{sk})\tilde{p}(s=v|u_k,m_k) \qquad \text{Equation 2}$$

The gate $c_{sk}$ is a predictor of whether the user confirms a slot value mentioned by the machine. In FIG. 3, $\tilde{p}(s=v|u_k, m_k)$ corresponds to the value pointer, while $c_{sk}$ decides whether in the turn pointer, attention is placed on $m_k$ or $u_k$. For example, in FIG. 4 the turn pointer in turn 3 points to $u_3$ for the food slot, but after the user confirms the word "Italian" in turn 4, the turn pointer points to $m_4$ for the food slot.

The gate $c_{sk}$ considers whether an affirmation is an explicit affirmation or an implicit affirmation. An explicit affirmation occurs when the machine asks the user a confirming question that includes a slot value. For example, the machine can ask the user "Did you say Chinese food?", where Chinese is the slot value for a food slot. An implicit confirmation occurs when the machine asks the user a question that is known to be an implicit confirming question (machine acts are known and labeled) and the user's response includes a slot value. For example, the machine may ask the user "What kind of food do you want to eat in downtown?". If the user responds "Italian", the user has implicitly confirmed "Italian" as the slot value for a food slot and "downtown" as the slot value for an area slot.

The gate $c_{sk}$ can be determined with the following equation:

$$c_{sk}=\max([\text{explconf}(s) \in m_k]\sigma(w_a^T \tau_k), [\text{implconf}(s) \in m_k] \\ (1-\Sigma_{v \in D_s}\tilde{p}(s=v|u_k,m_k))), \qquad \text{Equation 3}$$

where $\tau_k$ is the last hidden state of the hierarchical pointer network processing the turn (e.g., the last hidden state of the recurrent neural network processing the turn), $\omega_a$ is a learned weight vector, and $D_s$ is the dictionary (e.g., knowledge database) for slot s.

In some instances, the user utterance is "any" or "I don't care" without a reference to a slot. To distinguish between the slots the user does and does not care about, the machine act $m_t$ is taken into account. First, the machine act is converted into a tuple of indicators $m_{ks}$ for every slot s. For every possible machine act, an indication of whether the machine act is part of $m_k$ and pertains to s. The weights $V_m$ are then learned to modify the user utterance representation before it is compared to f(v). Effectively, this is the same as extending f(v) with $m_{ks}$. Keeping the weights separate, the weights $V_m$ can be shared between slots, while the part of V used to transform $\tau_k$ is specific to the slot s. This results in the following equation:

$$p(s=v|u_k,m_k) \propto \exp(f(v)^T(V_{us}\tau_k+V_m m_{ts})),\qquad \text{Equation 4}$$

where each value $v \in D_s$ has been transformed into a low-dimensional vector representation f(v), where f(v) is the embedding of the word in the knowledge database (e.g., a dictionary or ontology). $V_m$ allows the slots the machine did not ask about to be ignored, while the weights $V_{US}$ is to blend out semantically unrelated information from $\tau_k$, e.g., when the user mentions multiple slots.

A sample dialogue is shown in FIG. 4. The sample dialogue is related to a search, but other embodiments are not limited to this machine action. Other embodiments can perform different machine actions, such as sending an email or text message, initiating a telephone call, and completing a purchase.

Additionally, the sample dialogue is a simple and clear dialogue that is used to illustrate the method of FIG. 3. Because the sample dialogue is simple and clear (e.g., only one slot value in turns), the value pointers are depicted as pointing to the words. Additionally, the dialogue state is depicted as the currently-relevant slot value. Since only one slot value is mentioned in each turn, the probability distribution for the value pointer and for the dialogue state would highlight that word. This is why FIG. 4 does not depict the value pointer and the dialogue state as probability distributions.

In other embodiments, the dialogue may not be simple and clear. For example, a user utterance can include two words that sound similar, so it is not so clear if the words are slot values. Additionally, the user utterance may misspell a word when the user utterance has been processed by an SST (e.g., an automatic speech recognition program). Therefore, in general each value pointer would be a probability distribution over the one or more words in the user utterance that indicates whether each word is a slot value for a slot, and each dialogue state would be a probability distribution over all of the slot values for every slot.

Each turn includes a user utterance ($u_k$) and a machine act ($m_k$), where k equals a number 1 through n. In the illustrated embodiment, there are five turns (n=5). In turn 1 ($m_1$ and $u_1$), the machine initially asks "How may I help you?" ($m_1$) and the user responds "Find a restaurant in downtown" ($u_1$). The spoken dialogue system analyzes $u_1$ and determines that $u_1$ cites a slot value ("downtown") for an area slot. The spoken dialogue system produces a value pointer that points to the word "downtown" for the area slot. The value pointer represents a probability that the word "downtown" is a slot value for the area slot.

The spoken dialogue system also produces a turn pointer for turn 1 that represents a probability that turn 1 contains a currently-relevant slot value for the area slot ("downtown"). Thus, the value pointer points to (or places attention on) the word "downtown" and the turn pointer points to turn $u_1$ as containing the currently-relevant slot value for the area slot.

In turn 2 ($m_2$ and $u_2$), the machine asks the user "What food do you want to eat?" and the user responds "Is there a good Nepalese place?". At turn 2, the spoken dialogue system produces a value pointer that points to the word "Nepalese" for the food slot and a turn pointer that points to $u_1$ for the currently-relevant slot value ("downtown") for the area slot and points to $u_2$ for a currently-relevant slot value ("nepalese") for the food slot.

In turn 3 ($m_3$ and $u_3$), the machine states "I could not find any" and the user responds "How about Italian?". At turn 3, the spoken dialogue system produces a value pointer that points to the word "Italian" for the food slot and a turn pointer that points to $u_1$ for the currently-relevant slot value ("downtown") for the area slot and points to $u_3$ for a currently-relevant slot value ("italian") for the food slot.

In some aspects, the machine may ask a user to affirm a slot value when the machine is less certain about a user's utterance. In such situations, the spoken dialogue system will associate a low probability to the turn value for the user utterance and then confirm the slot value with the user. In FIG. 4, the probability for the slot value "Italian" is low in turn 3, so the machine asks the user the confirming question "Did you say Italian?" ($m_4$) in turn 4. The user responds to the query by saying "Yes" ($u_4$). Since the user confirmed the slot value "Italian", the turn pointer for the food slot will point to $m_4$ for the currently-relevant slot value ("italian") (based on the result of Equation 2). The turn pointer also points to $u_1$ for the currently-relevant slot value ("downtown") for the area slot.

In turn 5 ($m_5$ and $u_5$), the machine asks the user "Does Pizzaria Alberto sound good?" and the user responds "Can you give me the phone number?". At turn 5, the value pointer points to the word "phone" for the slot request, and the turn pointer points to $u_5$ for the currently-relevant slot value ("downtown") for the area slot and points to $m_4$ for a currently-relevant slot value ("italian") for the food slot.

The dialogue state for each turn. At each turn, the dialogue state may change so that each dialogue state contains the currently-relevant slot values for the slots. Each dialogue state is passed to a dialogue manager that determines a machine action based on the dialogue state.

A dialogue state points to each turn that includes the currently-relevant slot value for each slot. The dialogue state for each slot represents the probability that a slot value is the currently-relevant slot value. As described earlier, each dialogue state comprises a probability distribution over all of the slot values for every slot.

In FIG. 3, the dialogue state for turn 1 indicates the word "downtown" is the currently-relevant slot value for the area slot. The dialogue state for turn 2 indicates the word "downtown" is the currently-relevant slot value for the area slot and the word "Nepalese" is the currently-relevant slot value for the food slot. The dialogue states for turns 3, 4, and 5 all indicate the word "downtown" is the currently-relevant slot value for the area slot and the word "Italian" is the currently-relevant slot value for the food slot. The dialogue state for turn 5 also indicates the word "phone" is the currently-relevant slot value for the request slot.

Thus, aspects of the spoken dialogue system provide hierarchical state tracking. The state tracker can track the likelihoods of one or more slot values being cited in the turns (e.g., in a user utterance) and identify which turns contain the currently-relevant slot values (e.g., for each slot).

Figure 5:
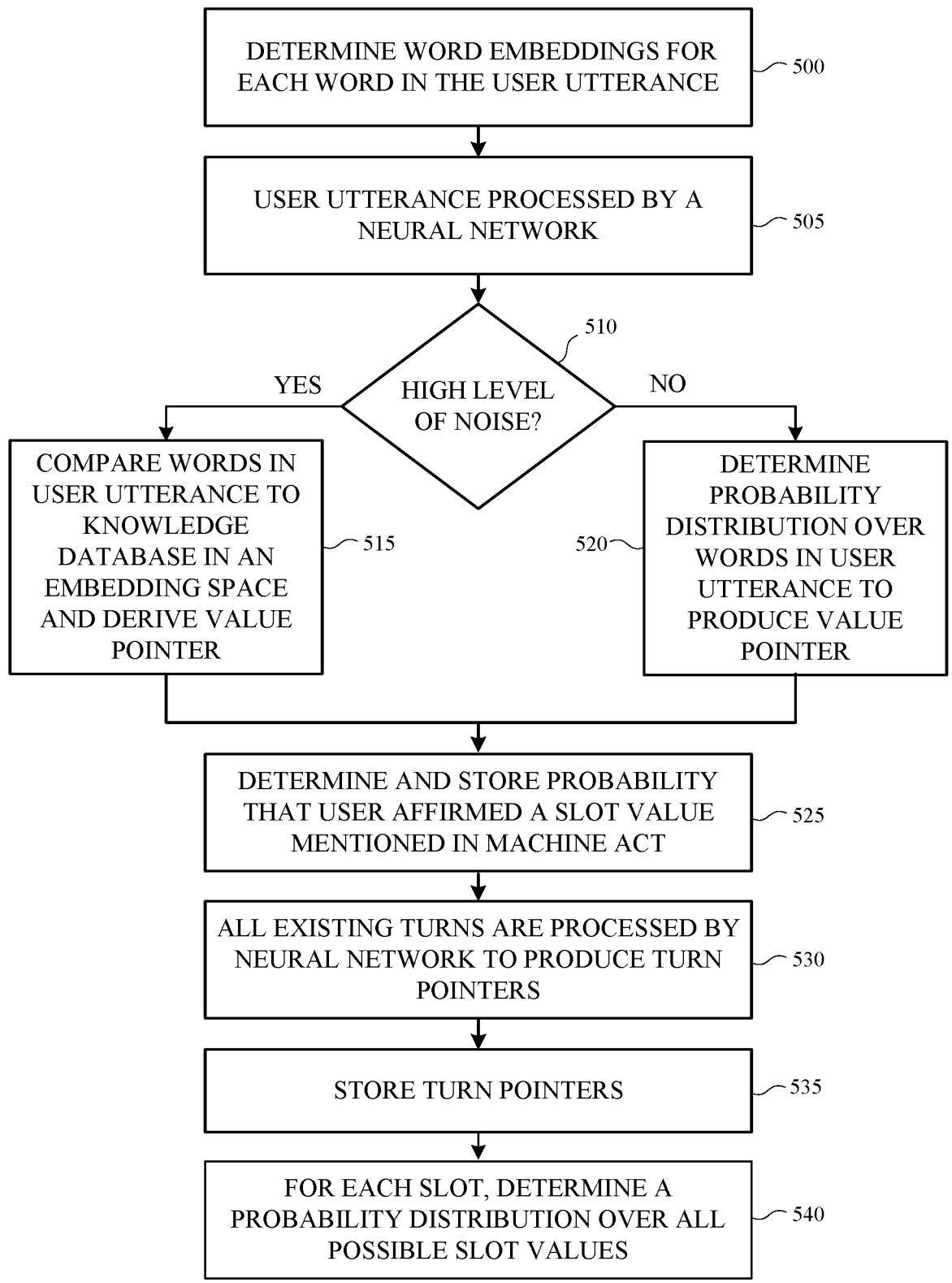
FIG. 5 is a flowchart depicting an example method of providing a value pointer and a turn pointer for a turn.

FIG. 5 illustrates an example flowchart of a method of providing a value pointer and a turn pointer for a turn. The operations depicted in FIG. 5 can be performed for each turn in a dialogue. Initially, at block 500, the words in the user utterance are extracted and a word embedding for each word is determined. The word embeddings are pre-defined and map the words into vectors. At block 505, the user utterance is processed by the hierarchical pointer network (e.g., a recurrent neural network such as a bi-directional recurrent neural network). In some aspects, the hierarchical pointer network takes all the words in the user utterance and computes a vector.

Thereafter, a determination is made at block 510 as to whether a high level of noise is present in the user utterance. For example, a user utterance may include a high level of background or ambient noise. Additionally or alternatively, a SST component may have incorrectly converted a spoken word into a text word, which is a form of noise. If there is a high level of noise in the user utterance, the process passes to block 515 where the words in the user utterance are compared to the knowledge database in an embedding space, and a pointer value is derived from the comparison. The method then passes to block 525.

If there is a low level of noise in the user utterance, the method continues at block 520 where a probability distribution over the words in the user utterance is determined to produce the value pointer(s) (e.g., the value pointer points to the word(s) in the user utterance). The method then passes to block 525.

Thus, a value pointer points to a word in the user utterance or to a word in the knowledge database (e.g., the dictionary or ontology). A value pointer may also point to zero (e.g., when a slot value is not mentioned in the turn).

At block 525, a probability that the user affirmed a slot value that was mentioned in the machine act in that turn is determined and stored. In one embodiment, the determination is performed through Equations 2 and 3. The value pointer points to the word in the machine act instead of to the knowledge database or to the user utterance when the second probability indicates the user affirmed the slot value. An example of this is shown in turn 4 in FIG. 4 (e.g., $m_4$ and $u_4$).

At block 530, all of the currently existing turns (the current turn and any previous turns) are processed by a hierarchical pointer network (e.g., a recurrent neural network such as a uni-directional recurrent neural network) to produce one or more turn pointers for the current turn. The turn pointer(s) are then stored at block 535. For example, the turn pointer or pointers can be stored in store 135 in FIG. 1.

A dialogue state for the turn is then determined at block 540. The dialogue state is provided by determining, for each slot, a probability distribution over all of the possible slot values for that slot.

Figure 6:
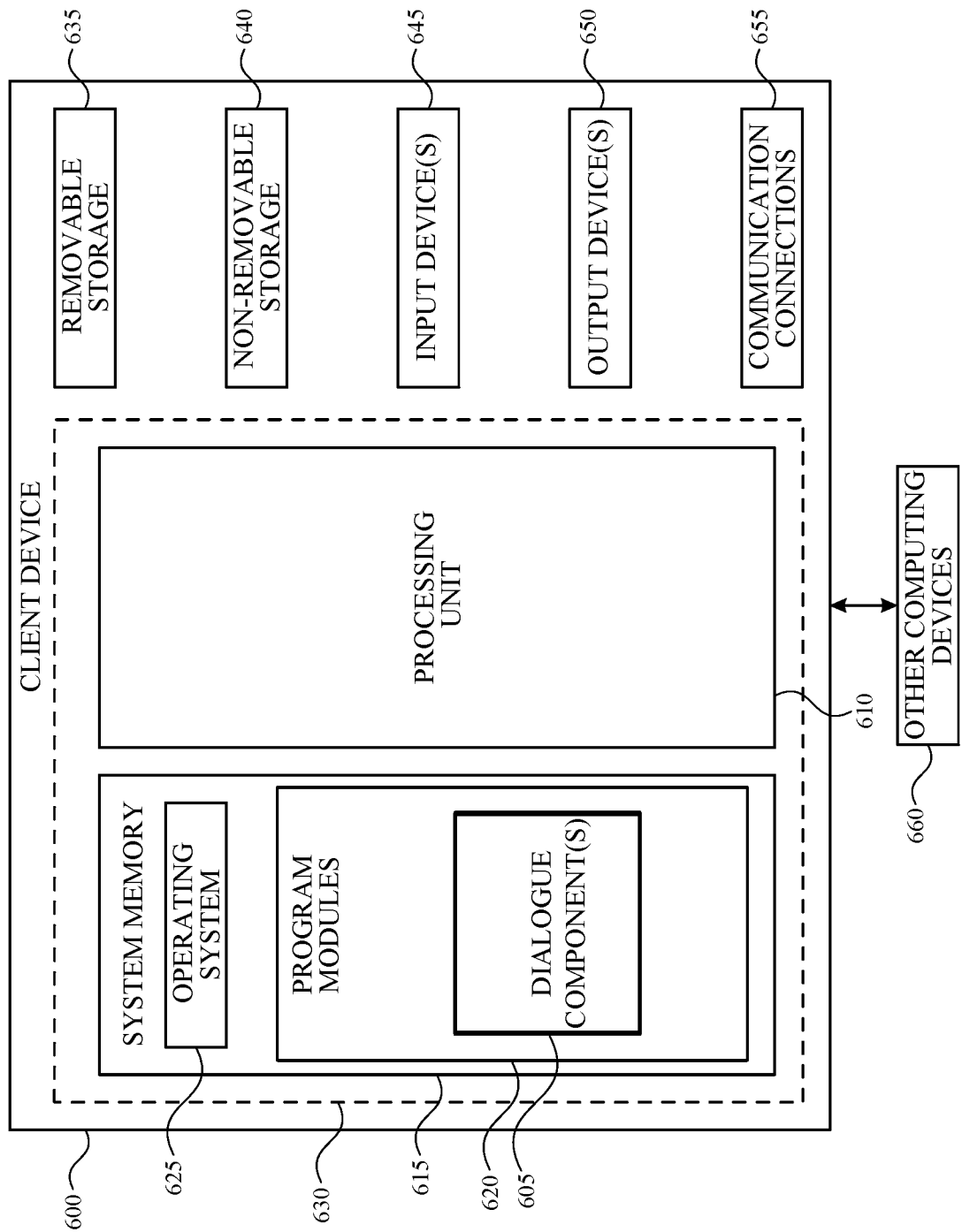
FIG. 6 depicts a block diagram of example physical components of an electronic device with which aspects of the disclosure may be practiced.
Figure 7A:
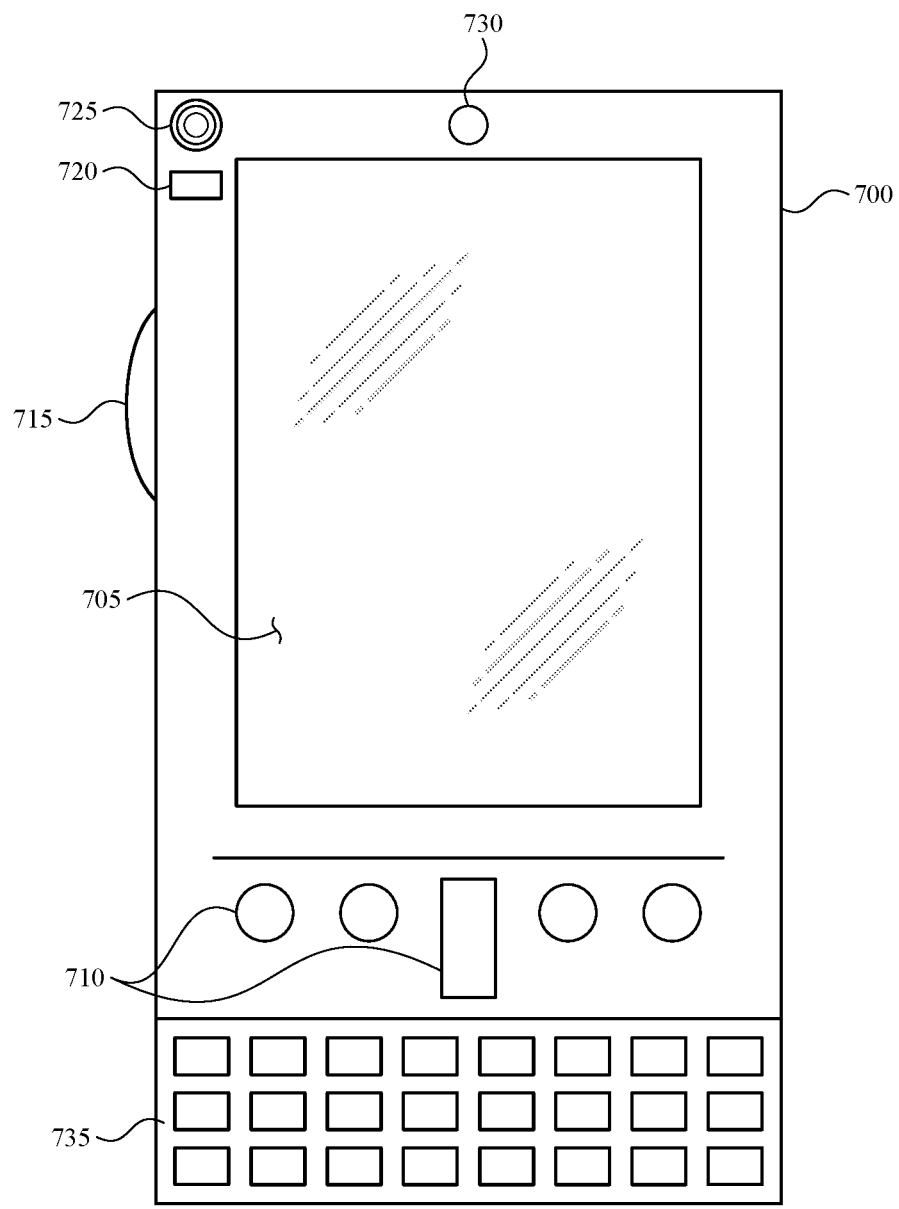
FIGS. 7A and 7B illustrate block diagrams of an example mobile computing device with which aspects of the present disclosure may be practiced.
Figure 7B:
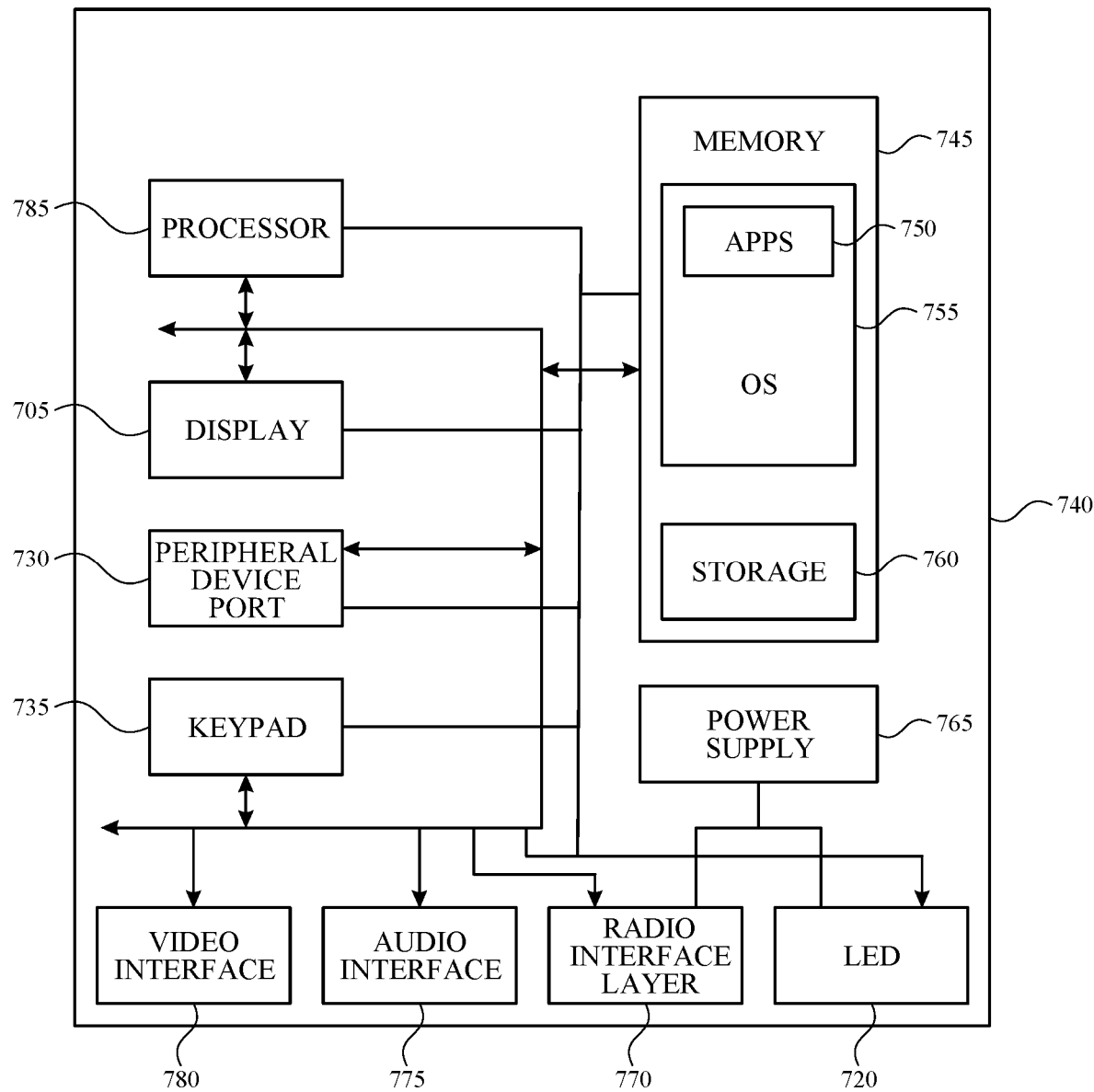

FIGS. 6-7B and the associated descriptions provide a discussion of a variety of operating environments in which aspects of the disclosure may be practiced. However, the devices and systems illustrated and discussed with respect to FIGS. 6-7B are for purposes of example and illustration and are not limiting of a vast number of electronic device configurations that may be utilized for practicing aspects of the disclosure, as described herein.

FIG. 6 is a block diagram illustrating physical components (e.g., hardware) of an electronic device 600 with which aspects of the disclosure may be practiced. The electronic device components described below may be suitable for the computing devices described above, including the client computing devices 110A and 110B and the server computing device 120.

In a basic configuration, the electronic device 600 may include at least one processing unit 610 and a system memory 615. Depending on the configuration and type of electronic device, the system memory 615 may comprise, but is not limited to, volatile storage (e.g., random access memory), non-volatile storage (e.g., read-only memory), flash memory, or any combination of such memories. The system memory 615 may include an operating system 625 and one or more program modules 620 suitable for parsing received input, determining subject matter of received input, determining actions associated with the input and so on.

The operating system 625, for example, may be suitable for controlling the operation of the electronic device 600. Furthermore, embodiments of the disclosure may be practiced in conjunction with a graphics library, other operating systems, or any other application program and is not limited to any particular application or system. This basic configuration is illustrated in FIG. 6 by those components within a dashed line 630.

The electronic device 600 may have additional features or functionality. For example, the electronic device 600 may also include additional data storage devices (removable and/or non-removable) such as, for example, magnetic disks, optical disks, or tape. Such additional storage is illustrated in FIG. 6 by a removable storage device 635 and a non-removable storage device 640.

As stated above, a number of program modules and data files may be stored in the system memory 615. While executing on the processing unit 610, the program modules 620 (e.g., a dialogue component(s) 605) may perform processes including, but not limited to, the aspects, as described herein.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit.

When operating via an SOC, the functionality, described herein, with respect to the capability of client to switch protocols may be operated via application-specific logic integrated with other components of the electronic device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The electronic device 600 may also have one or more input device(s) 645 such as a keyboard, a trackpad, a mouse, a pen, a sound or voice input device, a touch, force and/or swipe input device, etc. The output device(s) 650 such as a display, speakers, a printer, etc. may also be included. The aforementioned devices are examples and others may be used. The electronic device 600 may include one or more communication connections 655 allowing communications with other electronic devices 660. Examples of suitable communication connections 655 include, but are not limited to, radio frequency (RF) transmitter, receiver, and/or transceiver circuitry; universal serial bus (USB), parallel, and/or serial ports.

The term computer-readable media as used herein may include computer storage media. Computer storage media may include volatile and nonvolatile, removable and non-removable media implemented in any method or technology for storage of information, such as computer readable instructions, data structures, or program modules.

The system memory 615, the removable storage device 635, and the non-removable storage device 640 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the electronic device 600. Any such computer storage media may be part of the electronic device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 7A and 7B illustrate a mobile electronic device 700, for example, a mobile telephone, a smart phone, wearable computer (such as a smart watch), a tablet computer, a laptop computer, and the like, with which embodiments of the disclosure may be practiced. With reference to FIG. 7A, one aspect of a mobile electronic device 700 for implementing the aspects is illustrated.

In a basic configuration, the mobile electronic device 700 is a handheld computer having both input elements and output elements. The mobile electronic device 700 typically includes a display 705 and one or more input buttons 710 that allow the user to enter information into the mobile electronic device 700. The display 705 of the mobile electronic device 700 may also function as an input device (e.g., a display that accepts touch and/or force input).

If included, an optional side input element 715 allows further user input. The side input element 715 may be a rotary switch, a button, or any other type of manual input element. In alternative aspects, mobile electronic device 700 may incorporate more or less input elements. For example, the display 705 may not be a touch screen in some embodiments. In yet another alternative embodiment, the mobile electronic device 700 is a portable phone system, such as a cellular phone. The mobile electronic device 700 may also include an optional keypad 735. Optional keypad 735 may be a physical keypad or a "soft" keypad generated on the touch screen display.

In various embodiments, the output elements include the display 705 for showing a graphical user interface (GUI), a visual indicator 720 (e.g., a light emitting diode), and/or an audio transducer 725 (e.g., a speaker). In some aspects, the mobile electronic device 700 incorporates a vibration transducer for providing the user with tactile feedback. In yet another aspect, the mobile electronic device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of a mobile electronic device 700. That is, the mobile electronic device 700 can incorporate a system (e.g., an architecture) 740 to implement some aspects. In one embodiment, the system 740 is implemented as a "smart phone" capable of running one or more applications (e.g., browser, e-mail, calendaring, contact managers, messaging clients, games, media clients/players, content selection and sharing applications and so on). In some aspects, the system 740 is integrated as an electronic device, such as an integrated personal digital assistant (PDA) and wireless phone.

One or more application programs 750 may be loaded into the memory 745 and run on or in association with the operating system 755. Examples of the application programs include phone dialer programs, e-mail programs, personal information management (PIM) programs, word processing programs, spreadsheet programs, Internet browser programs, messaging programs, and so forth.

The system 740 also includes a non-volatile storage area 760 within the memory 745. The non-volatile storage area 760 may be used to store persistent information that should not be lost if the system 740 is powered down.

The application programs 750 may use and store information in the non-volatile storage area 760, such as email or other messages used by an email application, and the like. A synchronization application (not shown) also resides on the system 740 and is programmed to interact with a corresponding synchronization application resident on a host computer to keep the information stored in the non-volatile storage area 760 synchronized with corresponding information stored at the host computer.

The system 740 has a power supply 765, which may be implemented as one or more batteries. The power supply 765 may further include an external power source, such as an AC adapter or a powered docking cradle that supplements or recharges the batteries.

The system 740 may also include a radio interface layer 770 that performs the function of transmitting and receiving radio frequency communications. The radio interface layer 770 facilitates wireless connectivity between the system 740 and the "outside world," via a communications carrier or service provider. Transmissions to and from the radio interface layer 770 are conducted under control of the operating system 755. In other words, communications received by the radio interface layer 770 may be disseminated to the application programs 750 via the operating system 755, and vice versa.

The visual indicator 720 may be used to provide visual notifications, and/or an audio interface 775 may be used for producing audible notifications via an audio transducer (e.g., audio transducer 725 illustrated in FIG. 7A). In the illustrated embodiment, the visual indicator 720 is a light emitting diode (LED) and the audio transducer 725 may be a speaker. These devices may be directly coupled to the power supply 765 so that when activated, they remain on for a duration dictated by the notification mechanism even though the processor 785 and other components might shut down for conserving battery power. The LED may be programmed to remain on indefinitely until the user takes action to indicate the powered-on status of the device.

The audio interface 775 is used to provide audible signals to and receive audible signals from the user (e.g., voice input such as described above). For example, in addition to being coupled to the audio transducer 725, the audio interface 775 may also be coupled to a microphone to receive audible input, such as to facilitate a telephone conversation. In accordance with embodiments of the present disclosure, the microphone may also serve as an audio sensor to facilitate control of notifications, as will be described below.

The system 740 may further include a video interface 780 that enables an operation of peripheral device 730 (e.g., on-board camera) to record still images, video stream, and the like. The captured images may be provided to the artificial intelligence entity advertisement system such as described above.

A mobile electronic device 700 implementing the system 740 may have additional features or functionality. For example, the mobile electronic device 700 may also include additional data storage devices (removable and/or non-removable) such as, magnetic disks, optical disks, or tape. Such additional storage is illustrated in FIG. 7B by the non-volatile storage area 760.

Data/information generated or captured by the mobile electronic device 700 and stored via the system 740 may be stored locally on the mobile electronic device 700, as described above, or the data may be stored on any number of storage media that may be accessed by the device via the radio interface layer 770 or via a wired connection between the mobile electronic device 700 and a separate electronic device associated with the mobile electronic device 700, for example, a server computer in a distributed computing network, such as the Internet. As should be appreciated such data/information may be accessed via the mobile electronic device 700 via the radio interface layer 770 or via a distributed computing network. Similarly, such data/information may be readily transferred between electronic devices for storage and use according to well-known data/information transfer and storage means, including electronic mail and collaborative data/information sharing systems.

As should be appreciated, FIG. 7A and FIG. 7B are described for purposes of illustrating the present methods and systems and is not intended to limit the disclosure to a particular sequence of steps or a particular combination of hardware or software components.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The invention claimed is:

1. A computer-implemented method of state tracking in a spoken dialogue system, the method comprising:
   receiving a sequence of turns, each turn comprising:
      a numerical identifier;
      a user utterance comprising one or more words received at the spoken dialogue system; and
      a machine act comprising one or more words produced by the spoken dialogue system;
   providing, by the spoken dialogue system using a hierarchical pointer network that relates a slot value in one turn to a slot value in another turn, a first value pointer, wherein the first value pointer indicates a first slot value for a first slot based on a first user utterance in a first turn of the received sequence of turns;
   providing, by the spoken dialogue system, a first turn pointer for the first turn of the received sequence of turns,
      wherein the first turn is a current turn and includes a first numerical identifier,
      wherein the first turn pointer includes a second numerical identifier of a second turn in the sequence of turns,
      wherein the second turn is a prior turn of the sequence of turns,
      wherein the second turn is distinct from the first turn and includes at least one of a second user utterance or a second machine act having a second slot value for a second slot, and
      wherein the second slot value matches the first slot value;
   determining a first dialogue state for the first turn based at least on a combination of the first value pointer and the first turn pointer, wherein the first dialogue state is determined based on a predicted context output of the hierarchical pointer network; and
   determining a first machine act of the first turn to be performed by the spoken dialogue system based on the determined first dialogue state.

2. The computer-implemented method of claim 1, wherein the first value pointer comprises a probability distribution over the one or more words in the first user utterance or over the one or more words in a knowledge database.

3. The computer-implemented method of claim 2, wherein providing the first value pointer comprises producing the probability distribution over the one or more words in the first user utterance to indicate whether each word in the first user utterance is the first slot value for the first slot.

4. The computer-implemented method of claim 3, wherein the probability distribution is a first probability distribution and the operation of providing the first value pointer further comprises:
   determining a second probability distribution that a user affirmed the first slot value mentioned in the first machine act of the first turn; and
   when the user affirmed the first slot value, causing the first value pointer to point to the word cited in the first machine act.

5. The computer-implemented method of claim 2, wherein providing the first value pointer comprises producing the probability distribution by comparing the one or more words in the first user utterance to corresponding one or more words in the knowledge database.

6. The computer-implemented method of claim 5, wherein the probability distribution is a first probability distribution, and wherein providing the first value pointer further comprises:

for a respective turn in the sequence of turns, determining a second probability distribution that a user affirmed the first slot value mentioned in the first machine act of the first turn; and when the user affirmed the first slot value, causing the first value pointer to point to a word cited in the first machine act.

7. The computer-implemented method of claim 5, wherein providing the first value pointer comprises processing each word in the first user utterance, and wherein the hierarchical pointer network is configured as a recurrent neural network.

8. The computer-implemented method of claim 7, wherein the recurrent neural network comprises a bi-directional neural network.

9. The computer-implemented method of claim 2, wherein the probability distribution is a first probability distribution, and wherein determining the first dialogue state for the first slot comprises determining, for each slot, a second probability distribution over all possible slot values for every slot.

10. The computer-implemented method of claim 9, further comprising:

determining the first machine act to be performed by the spoken dialogue system based on the second probability distribution over all possible slot values for every slot; and causing the spoken dialogue system to perform the first machine act.

11. The computer-implemented method of claim 10, wherein the first machine act comprises:

asking a confirming question;
asking for more information; or
sending a message.

12. A system, comprising:

at least one processing unit; and
at least one memory storing computer executable instructions that, when executed by the at least one processing unit, cause the system to:
receive a sequence of turns, each turn comprising:
a numerical identifier;
a user utterance comprising one or more words received at a spoken dialogue system; and
a machine act comprising one or more words produced by the spoken dialogue system;
provide, by the spoken dialogue system using a hierarchical pointer network that relates a slot value in one turn to a slot value in another turn, a first value pointer, wherein the first value pointer indicates a first slot value for a first slot based on a first user utterance in a first turn of the received sequence of turns;
provide, by the spoken dialogue system, a first turn pointer for the first turn of the received sequence of turns,
wherein the first turn is a current turn and includes a first numerical identifier,
wherein the first turn pointer includes a second numerical identifier of a second turn in the sequence of turns,
wherein the second turn is a prior turn of the sequence of turns,
wherein the second turn is distinct from the first turn and includes at least one of a second user utterance or a second machine act having a second slot value for a second slot, the second turn associated with a designator identifying an utterance type or a machine act type, respectively, and
wherein the second slot value matches the first slot value;
determine a first dialogue state for the first turn based at least on a combination of the first value pointer and the first turn pointer, wherein the first dialogue state is determined based on a predicted context output of the hierarchical pointer network; and
determine a first machine act of the first turn to be performed by the spoken dialogue system based on the determined first dialogue state.

13. The system of claim 12, further comprising instructions for accessing a knowledge database.

14. The system of claim 13, wherein the first value pointer comprises a probability distribution over the one or more words in the first user utterance or over the one or more words in a knowledge database.

15. The system of claim 14, wherein the instructions for providing the first value pointer comprise instructions for:

producing the probability distribution by comparing the one or more words in the first user utterance to corresponding one or more words in the knowledge database; or producing the probability distribution over the one or more words in the first user utterance to indicate whether each word in the first user utterance is the first slot value for the first slot.

16. The system of claim 15, wherein the probability distribution is a first probability distribution and the instructions for providing the first value pointer further comprises instructions for:

determining a second probability distribution that a user affirmed the first slot value mentioned in the first machine act of the first turn; and when the user affirmed the first slot value, causing the first value pointer to point to the word cited in the first machine act.

17. The system of claim 15, wherein the instructions for providing the first value pointer comprise instructions for processing each word in the first user utterance, and wherein the hierarchical pointer network is configured as a recurrent neural network.

18. The system of claim 14, wherein the probability distribution is a first probability distribution, and wherein determining the first dialogue state for the first slot comprises determining, for each slot, a second probability distribution over all possible slot values.

19. The system of claim 18, the instructions further causing the system to:

determine the first machine act to be performed by the spoken dialogue system based on the second probability distribution over all possible slot values for every slot; and cause the spoken dialogue system to provide a response that corresponds to the first machine act.

20. The system of claim 12, wherein the system comprises a server computing device.

* * * * *